US009935341B2

(12) United States Patent
Bu et al.

(10) Patent No.: US 9,935,341 B2
(45) Date of Patent: Apr. 3, 2018

(54) METHOD AND SYSTEM FOR CONTROLLING POWER BATTERY

(71) Applicant: BYD COMPANY LIMITED, Shenzhen, Guangdong (CN)

(72) Inventors: Fangfang Bu, Shenzhen (CN); Hongjun Wang, Shenzhen (CN); Chao Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 50 days.

(21) Appl. No.: 15/242,301

(22) Filed: Aug. 19, 2016

(65) Prior Publication Data

US 2016/0359204 A1 Dec. 8, 2016

Related U.S. Application Data

(63) Continuation of application No. PCT/CN2015/075494, filed on Mar. 31, 2015.

(30) Foreign Application Priority Data

Apr. 2, 2014 (CN) .......................... 2014 1 0131974

(51) Int. Cl.
*H01M 10/44* (2006.01)
*H01M 10/48* (2006.01)
(Continued)

(52) U.S. Cl.
CPC ..... *H01M 10/443* (2013.01); *H01M 10/4207* (2013.01); *H01M 10/441* (2013.01);
(Continued)

(58) Field of Classification Search
CPC .. H01M 10/443; H01M 10/48; H01M 10/482; H01M 10/4207; H01M 10/441
See application file for complete search history.

(56) References Cited

U.S. PATENT DOCUMENTS 9,774,062 B2 * 9/2017 Matsunaga ......... H01M 10/443
2013/0264999 A1 10/2013 Srinivasan et al.
(Continued)

FOREIGN PATENT DOCUMENTS

CN 1606189 A 4/2005
WO 2013/128808 A1 9/2013

OTHER PUBLICATIONS

International Search Report and Written Opinion for PCT/CN2015/075494, dated Jun. 30, 2015, 12 pages.
(Continued)

*Primary Examiner* — Stewart A Fraser

(57) ABSTRACT

A method for controlling a power battery is provided. The method includes: detecting a maximum temperature and a minimum temperature of the plurality of single cells, a plurality of first temperatures of positive electrodes and/or a plurality of second temperatures of negative electrodes, and a plurality of third temperatures of cores; determining whether the plurality of first temperatures and/or the plurality of second temperatures are within a first temperature range; determining whether the plurality of third temperatures are within a second temperature range; managing the power battery; and determining that a connection failure occurs in the power battery if one of the plurality of first temperatures and/or one of the plurality of second temperatures is not within the first temperature range; and determining a core related failure if the third temperature of a first single cell is not within the second temperature range. Further, a system for controlling a power battery is provided.

20 Claims, 4 Drawing Sheets

(51) Int. Cl.
*H01M 10/42* (2006.01)
*H01M 10/625* (2014.01)
*H01M 10/615* (2014.01)
*H01M 10/613* (2014.01)

(52) U.S. Cl.
CPC ......... *H01M 10/48* (2013.01); *H01M 10/482* (2013.01); *H01M 10/486* (2013.01); *H01M 10/613* (2015.04); *H01M 10/615* (2015.04); *H01M 10/625* (2015.04); *H01M 2010/4278* (2013.01); *H01M 2220/20* (2013.01)

(56) References Cited

U.S. PATENT DOCUMENTS

| | | | | |
|---|---|---|---|---|
| 2014/0028267 A1* | 1/2014 | Lee | ............... | H02J 7/0052 320/152 |
| 2014/0121869 A1* | 5/2014 | Lee | ............... | B60L 11/1866 701/22 |
| 2015/0004449 A1* | 1/2015 | Lim | ............... | H01M 10/625 429/62 |
| 2016/0091374 A1* | 3/2016 | Kim | ............... | G01K 15/005 702/99 |
| 2016/0294021 A1* | 10/2016 | Ueno | ............... | H01M 10/443 |
| 2017/0125856 A1* | 5/2017 | Okada | ............... | H01M 10/482 |

OTHER PUBLICATIONS

European Search Report for Application No. EP 15773514.3, dated Nov. 7, 2016, 4 pages.

\* cited by examiner

METHOD AND SYSTEM FOR CONTROLLING POWER BATTERY

CROSS-REFERENCE TO RELATED APPLICATION

This application is a continuation application of International Application No. PCT/CN2015/075494, filed Mar. 31, 2015, which is based upon and claims priority to Chinese Patent Application No. 201410131974.3, filed with the State Intellectual Property Office of P. R. China on Apr. 2, 2014. The entire contents of the above referenced applications are incorporated herein by reference.

FIELD

The present disclosure relates to a battery management field, and more particularly to a method for controlling a power battery and a system for controlling a power battery.

BACKGROUND

At present, with the development of electric vehicles, a power battery, as an energy source of an electric vehicle, should be in a safe state. If a temperature of the power battery is too high or too low, or there are connection problems occurring in the power battery, the life of the power battery and the safety of the electric vehicle may be affected. Therefore, it is particularly important to control and monitor the power battery.

SUMMARY

Embodiments of the present disclosure seek to solve at least one of the problems existing in the related art to at least some extent.

A first objective of the present disclosure is to provide a method for controlling a power battery.

A second objective of the present disclosure is to provide a system for controlling a power battery.

In order to achieve above objectives, embodiments of a first aspect of the present disclosure provide a method for controlling a power battery. The power battery includes a plurality of battery modules, and each battery module includes a plurality of single cells. The method includes: detecting a maximum temperature and a minimum temperature of the plurality of single cells, a plurality of first temperatures of positive electrodes of the plurality of battery modules and/or a plurality of second temperatures of negative electrodes of the plurality of battery modules, and a plurality of third temperatures of cores of the plurality of single cells by a temperature detecting module; determining whether the plurality of first temperatures and/or the plurality of second temperatures are within a first temperature range; determining whether the plurality of third temperatures are within a second temperature range; managing the power battery according to the maximum temperature and the minimum temperature if the plurality of first temperatures and/or the plurality of second temperatures are within the first temperature range and the plurality of third temperatures are within the second temperature range; and determining that a connection failure occurs in the power battery if one of the plurality of first temperatures and/or one of the plurality of second temperatures is not within the first temperature range; and determining a core related failure if the third temperature of a first single cell is not within the second temperature range.

With the method for controlling the power battery, causes of an abnormal temperature can be determined, and appropriate actions can be taken according to the different causes. For example, if the abnormal temperature is caused by an excessive high charging/discharging power of the power battery or other factors, it is needed to control the charging/discharging power of the power battery and/or to heat or cool the power battery to ensure that the temperature of the power battery returns to normal. If the abnormal temperature is caused by a connection failure or by a core failure, it is needed to troubleshoot and to stop charging/discharging the power battery if the connection failure or the core failure is determined, thus extending the life of the power battery and increasing the reliability of the power battery.

Embodiments of a second aspect of the present disclosure provide a system for controlling a power battery. The power battery includes a plurality of battery modules, and each battery module includes a plurality of single cells. The system includes: a temperature detecting module, configured to detect a maximum temperature and a minimum temperature of the plurality of single cells, a plurality of first temperatures of positive electrodes of the plurality of battery modules and/or a plurality of second temperatures of negative electrodes of the plurality of battery modules, and a plurality of third temperatures of cores of the plurality of single cells; a controlling module, configured to determine whether the plurality of first temperatures and/or the plurality of second temperatures are within a first temperature range; and determine whether the plurality of third temperatures are within a second temperature range; and manage the power battery according to the maximum temperature and the minimum temperature if the plurality of first temperatures and/or the plurality of second temperatures are within the first temperature range and the plurality of third temperatures are within the second temperature range; and determine that a connection failure occurs in the power battery if one of the plurality of first temperatures and/or one of the plurality of second temperatures is not within the first temperature range; and determine a core related failure if the third temperature of a first single cell is not within the second temperature range.

With the system for controlling the power battery, causes of an abnormal temperature can be determined, and appropriate actions can be taken according to the different causes. For example, if the abnormal temperature is caused by an excessive high charging/discharging power of the power battery or other factors, it is needed to control the charging/discharging power of the power battery and/or to heat or cool the power battery to ensure that the temperature of the power battery returns to normal. If the abnormal temperature is caused by a connection failure or by a core failure, it is needed to troubleshoot and to stop charging/discharging the power battery if the connection failure or the core failure is determined, thus extending the life of the power battery and increasing the reliability of the power battery.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
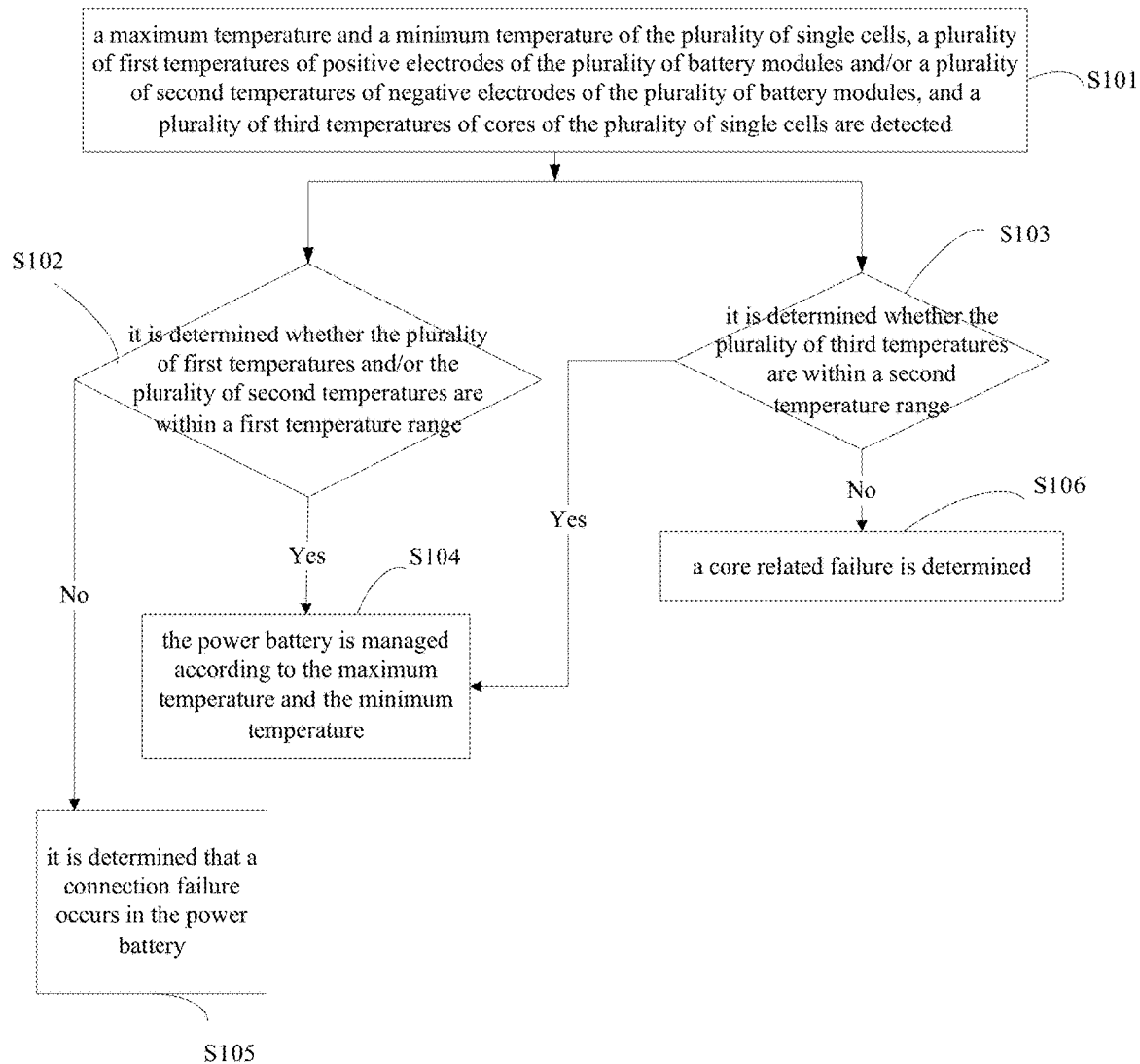
FIG. 1 is a flow chart of a method for controlling a power battery according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, unless specified or limited otherwise, it should be noted that, terms "mounted," "connected" and "coupled" may be understood broadly, such as electronic connections or mechanical connections, inner communications between two elements, direct connections or indirect connections via intermediary structures. These having ordinary skills in the art should understand the specific meanings in the present disclosure according to specific situations.

A method for controlling a power battery and a system for controlling a power battery will be described in the following with reference to drawings.

Figure 2:
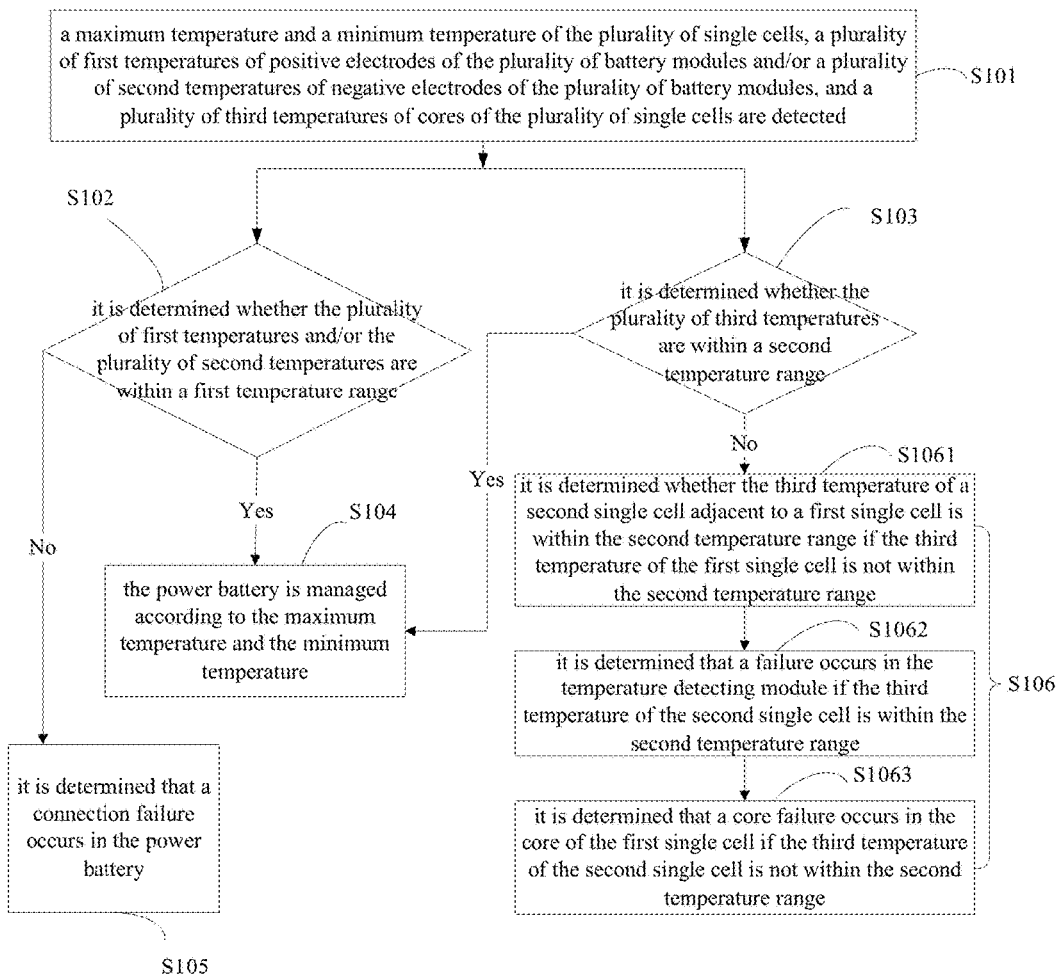
FIG. 2 is a flow chart of a method for controlling a power battery according to another embodiment of the present disclosure.

FIG. 1 is a flow chart of a method for controlling a power battery according to an embodiment of the present disclosure. FIG. 2 is a flow chart of a method for controlling a power battery according to another embodiment of the present disclosure.

Figure 3:
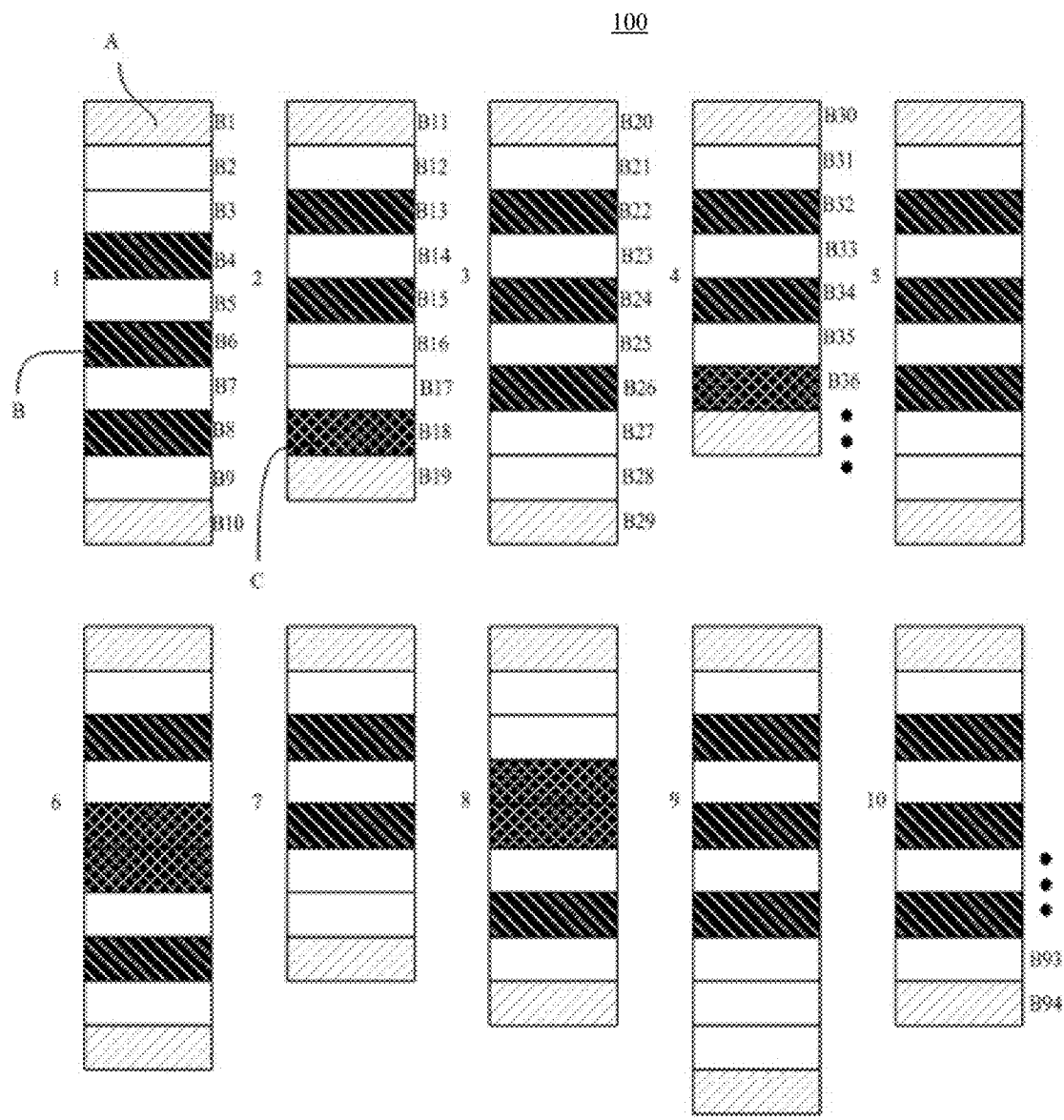
FIG. 3 is a schematic diagram of a power battery according to an embodiment of the present disclosure.

FIG. 3 is a schematic diagram of a power battery according to an embodiment of the present disclosure. As shown in FIG. 3, the power battery 100 includes a plurality of battery modules. For example, there are 10 battery modules in FIG. 3, which are battery modules 1-10. Each battery module includes a plurality of single cells. As shown in FIG. 3, the battery module 1 includes 10 single cells, which are single cells B1-B10. The battery module 2 includes 9 single cells, which are single cells B11-B19. The battery module 3 includes 10 single cells, which are single cells B20-B29.

The single cells B1-B10 may be sequentially connected in series, e.g., the single cell B10 of the battery module 1 is connected with the single cell B11 of the battery module 2 in series, and the single cell B19 of the battery module 2 is connected with the single cell B20 of the battery module 3 in series, and so on.

Referring to FIG. 1 and FIG. 2, the method includes the following steps.

At step S101, a maximum temperature and a minimum temperature of the plurality of single cells, a plurality of first temperatures of positive electrodes of the plurality of battery modules and/or a plurality of second temperatures of negative electrodes of the plurality of battery modules, and a plurality of third temperatures of cores of the plurality of single cells are detected by a temperature detecting module.

There are different ways to detect the maximum temperature and the minimum temperature of the plurality of single cells. In some embodiments, the maximum temperature and the minimum temperature may be detected by detecting a temperature of each single cell and choose the maximum temperature and the minimum temperature. Of course, the maximum temperature and the minimum temperature can also be detected by identifying detecting positions corresponding to the maximum temperature and the minimum temperature respectively by trial and experience according to a form of the power battery and an arrangement of each part of the power battery. In this way, the maximum temperature and the minimum temperature are detected by detecting temperatures at the detecting positions, and there is no need to detect the temperature of each single cell. And the detected temperatures at the detecting positions represent the maximum temperature and the minimum temperature.

In some embodiments, as shown in FIG. 3, the detecting positions may include four positions, such as a position denoted by an indication "C" in FIG. 3. The time for colleting the maximum temperature and the minimum temperature may be reduced by detecting the temperatures at the detecting positions. Of course, different power batteries may have different detecting positions, and the indication "C" in FIG. 3 is merely for exemplary purposes.

In some embodiments, as shown in FIG. 3, a first temperature of a positive electrode of a battery module and a second temperature of a negative electrode of the battery module can be detected by a temperature detecting module disposed on a position "A" representing a position of the positive electrode and/or the negative electrode of the battery module. A temperature of the position "A" can reflect a temperature of a connection position of the battery module and its adjacent battery module.

In some embodiments, as shown in FIG. 3, a third temperature of a core of a single cell can be detected by a temperature detecting module disposed on a position "B" of the single cell. In some embodiments, in order to reduce the number of temperature detecting positions, there is no need to detect each of the cores of the plurality of single cells, but detect temperatures of the cores at intervals. As shown in FIG. 3, for the adjacent single cells in the battery module 1, for example, the adjacent single cells B3 and B4, and the adjacent single cells B5 and B6, only the temperatures of the cores of the single cells B4 and B6 are required to be detected, because that in the adjacent single cells, for example the adjacent single cells B3 and B4, if a temperature of a core of the single cell B4 is too high, the high temperature of the single cell B4 may lead to a rise of the temperatures of the cores of the single cells B3 and B5 adjacent to the single cell B4. Thus, the temperature detecting positions "B" of the plurality of single cells can be disposed at intervals, for example, in the manner as shown in FIG. 3.

At step S102, it is determined whether the plurality of first temperatures and/or the plurality of second temperatures are within a first temperature range.

At step S103, it is determined whether the plurality of third temperatures are within a second temperature range.

Typically, if no failure occurs in the power battery, the plurality of first temperatures and the plurality of second temperatures are not too high and too low, and usually a variation of the first temperature of a positive electrode of each battery module is restricted and a variation of the second temperature of a negative electrode of each battery module is restricted. Therefore, a first temperature range reflecting a first maximum limit and a first minimum limit of the plurality of first temperatures and a second maximum limit and a second minimum limit of the plurality of second temperatures in a case that no failure occurs in the power battery is set. The first temperature range can be set by experience. For example, the first temperature range can be set as [−5°, 40°], which is merely exemplary. Likewise, normally, the plurality of third temperatures are within a temperature range, for example, a second temperature range, and the second temperature range can be set by experience.

At step S104, the power battery is managed according to the maximum temperature and the minimum temperature if the plurality of first temperatures and/or the plurality of second temperatures are within the first temperature range and the plurality of third temperatures are within the second temperature range.

That is, if it is determined that the plurality of first temperatures and/or the plurality of second temperatures are within the first temperature range and the plurality of third temperatures are within the second temperature range, it is determined that the power battery is normal, and there is no failure occurring in the power battery and nothing is abnormal in the power battery. And then the power battery may be managed according to the maximum temperature and the minimum temperature. In some embodiments, a step of managing the power battery according to the maximum temperature and the minimum temperature includes: heating or cooling the power battery according to the maximum temperature and the minimum temperature; and controlling a charging/discharging power of the power battery according to the maximum temperature and the minimum temperature. In this way, a situation that the temperature of the power battery is too high or too low may be avoided, and the using life of the power battery may be extended effectively.

At step S105, it is determined that a connection failure occurs in the power battery if one of the plurality of first temperatures and/or one of the plurality of second temperatures is not within the first temperature range.

At step S106, a core related failure is determined if the third temperature of a first single cell is not within the second temperature range.

In some embodiments, as shown in FIG. 2, step S106 includes following steps.

At step S1061, it is determined whether the third temperature of a second single cell adjacent to a first single cell is within the second temperature range if the third temperature of the first single cell is not within the second temperature range.

At step S1062, it is determined that a failure occurs in the temperature detecting module if the third temperature of the second single cell is within the second temperature range.

At step S1063, it is determined that a core failure occurs in the core of the first single cell if the third temperature of the second single cell is not within the second temperature range.

In some embodiments, the method for controlling the power battery further includes not allowing charging/discharging the power battery if it is determined that the connection failure occurs in the power battery or the core failure occurs in the core of the first single cell; and allowing charging/discharging the power battery if no connection failure occurs in the power battery and no core failure occurs in the cores of the plurality of single cells.

In some embodiments, the temperature detecting module is configured as a temperature sensor.

As shown in FIG. 3, for example, four temperature detecting positions "C" may reflect the temperature of the power battery, and the four temperature detecting positions "C" can be used in a vehicle control strategy. Twenty temperature detecting positions "A" may reflect whether the connections between the plurality of battery modules are reliable. When a temperature at one position of the twenty temperature detecting positions "A" is abnormal, it cannot simply rely on the vehicle cooling system to cool the vehicle, and it is needed to determine whether the connections between the plurality of battery modules are reliable and whether there is a virtual connection, such that the fundamental problem can be solved. Twenty-four temperature detecting positions "B" may reflect the plurality of third temperatures of the cores of the plurality of single cells. When a third temperature is abnormal, it also cannot simply rely on the vehicle cooling system to solve the issue that the temperature of the power battery is too high, and it is needed to determine whether there is a problem in the cores of the plurality of single cells, such that the problem can be solved by troubleshooting an abnormal core.

In some embodiments, if it is detected that the temperatures of the temperature detecting positions "A" and "B" are below or above a certain value (i.e. the operating range of the temperature sensor), and temperatures of adjacent single cells are normal, it is determined that a failure occurs in the temperature detecting module. There is no need to heat or cool.

In some embodiments, the method further includes displaying an alarm message if it is determined that the connection failure occurs in the power battery. In some embodiments, the method further includes displaying an alarm message if it is determined that the core failure occurs in the first single cell. The alarm message may remind the user.

With the method for controlling the power battery, causes of an abnormal temperature can be determined, and appropriate actions can be taken according to the different causes. For example, if the abnormal temperature is caused by an excessive high charging/discharging power of the power battery or other factors, it is needed to control the charging/discharging power of the power battery and/or to heat or cool the power battery to ensure that the temperature of the power battery returns to normal. If the abnormal temperature is caused by the connection failure or by the core failure, it is needed to troubleshoot and to stop charging/discharging the power battery if the connection failure or the core failure is determined, thus extending the life of the power battery and increasing the reliability of the power battery.

Figure 4:
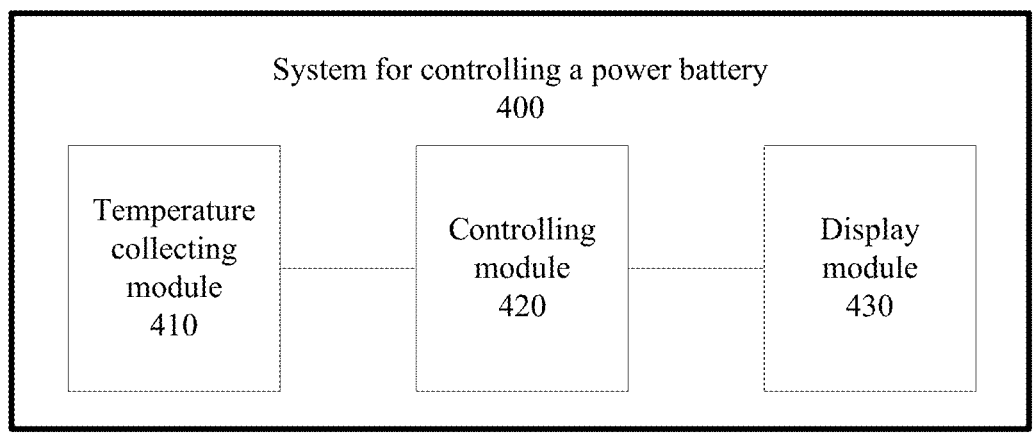
FIG. 4 is a block diagram of a system for controlling a power battery according to an embodiment of the present disclosure.

In some embodiments, as shown in FIG. 4, the system 400 for controlling the power battery is provided. The power battery comprises a plurality of battery modules. Each battery module comprises a plurality of single cells. The system 400 includes a temperature detecting module 410 and a controlling module 420. The temperature detecting module 410 is configured to detect a maximum temperature and a minimum temperature of the plurality of single cells, a plurality of first temperatures of positive electrodes of the plurality of battery modules and/or a plurality of second temperatures of negative electrodes of the plurality of battery modules, and a plurality of third temperatures of cores of the plurality of single cells. The controlling module 420 is configured to determine whether the plurality of first temperatures and/or the plurality of second temperatures are within a first temperature range; and determine whether the plurality of third temperatures are within a second temperature range; and manage the power battery according to the maximum temperature and the minimum temperature if the plurality of first temperatures and/or the plurality of second temperatures are within the first temperature range and the plurality of third temperatures are within the second temperature range; and determine that a connection failure occurs in the power battery if one of the plurality of first temperatures and/or one of the plurality of second temperatures is not within the first temperature range; and determine a core related failure if the third temperature of a first single cell is not within the second temperature range.

In some embodiments, the controlling module 420 is configured to determine a core related failure if the third temperature of a first single cell is not within the second temperature range by steps of: determining whether the third temperature of a second single cell adjacent to the first single cell is within the second temperature range if the third temperature of the first single cell is not within the second temperature range; and determining that the a failure occurs in the temperature detecting module if the third temperature of the second single cell is within the second temperature range; and determining that a core failure occurs in the core of the first single cell if the third temperature of the second single cell is not within the second temperature range.

In some embodiments, the controlling module 420 is further configured to not allow charging/discharging the power battery if it is determined that the connection failure occurs in the power battery or the core failure occurs in the core of the first single cell; and to allow charging/discharging the power battery if no connection failure occurs in the power battery and no core failure occurs in the cores of the plurality of single cells.

In some embodiments, the controlling module 420 is configured to manage the power battery according to the maximum temperature and the minimum temperature by steps of: heating or cooling the power battery according to the maximum temperature and the minimum temperature; and controlling a charging/discharging power of the power battery according to the maximum temperature and the minimum temperature.

In some embodiments, as shown in FIG. 4, the system 400 further includes a display module 430 configured to display an alarm message if it is determined that the connection failure occurs in the power battery or that the core failure occurs in the core of the first single cell.

In some embodiments, the temperature detecting module 410 is configured as a temperature sensor.

With the system for controlling the power battery, causes of an abnormal temperature can be determined, and appropriate actions can be taken according to the different causes. For example, if the abnormal temperature is caused by an excessive high charging/discharging power of the power battery or other factors, it is needed to control the charging/discharging power of the power battery and/or to heat or cool the power battery to ensure that the temperature of the power battery returns to normal. If the abnormal temperature is caused by the connection failure or by the core failure, it is needed to troubleshoot and to stop charging/discharging the power battery if the connection failure or the core failure is determined, thus extending the life of the power battery and increasing the reliability of the power battery.

Any process or method described in a flow chart or described herein in other ways may be understood to include one or more modules, segments or portions including codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to acquire the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a power battery, wherein the power battery comprises a plurality of battery modules, each battery module comprises a plurality of single cells, and the method comprises:
   detecting a maximum temperature and a minimum temperature of the plurality of single cells, a plurality of first temperatures of positive electrodes of the plurality of battery modules and/or a plurality of second temperatures of negative electrodes of the plurality of battery modules, and a plurality of third temperatures of cores of the plurality of single cells by a temperature detecting module;
   determining whether the plurality of first temperatures and/or the plurality of second temperatures are within a first temperature range;
   determining whether the plurality of third temperatures are within a second temperature range;
   managing the power battery according to the maximum temperature and the minimum temperature if the plurality of first temperatures and/or the plurality of second temperatures are within the first temperature range and the plurality of third temperatures are within the second temperature range;
   determining that a connection failure occurs in the power battery if one of the plurality of first temperatures and/or one of the plurality of second temperatures is not within the first temperature range; and
   determining a core related failure if the third temperature of a first single cell is not within the second temperature range.

2. The method according to claim 1, wherein determining a core related failure if the third temperature of a first single cell is not within the second temperature range comprises:
   determining whether the third temperature of a second single cell adjacent to the first single cell is within the second temperature range if the third temperature of the first single cell is not within the second temperature range;
   determining that a failure occurs in the temperature detecting module if the third temperature of the second single cell is within the second temperature range;
   determining that a core failure occurs in the core of the first single cell if the third temperature of the second single cell is not within the second temperature range.

3. The method according to claim 2, further comprising:
   not allowing charging/discharging the power battery if it is determined that the connection failure occurs in the power battery or the core failure occurs in the core of the first single cell;
   allowing charging/discharging the power battery if no connection failure occurs in the power battery and no core failure occurs in the cores of the plurality of single cells.

4. The method according to claim 2, further comprising: sending an alarm message, if it is determined that the core failure occurs in the core of the first single cell.

5. The method according to claim 1, wherein managing the power battery according to the maximum temperature and the minimum temperature comprises:
   heating or cooling the power battery according to the maximum temperature and the minimum temperature; and
   controlling a charging/discharging power of the power battery according to the maximum temperature and the minimum temperature.

6. The method according to claim 1, further comprising: sending an alarm message, if it is determined that the connection failure occurs in the power battery.

7. The method according to claim 1, wherein the temperature detecting module is configured as a temperature sensor.

8. A system for controlling a power battery, wherein the power battery comprises a plurality of battery modules, each battery module comprises a plurality of single cells, and the system comprises:
   a temperature detecting module, configured to detect a maximum temperature and a minimum temperature of the plurality of single cells, a plurality of first temperatures of positive electrodes of the plurality of battery modules and/or a plurality of second temperatures of negative electrodes of the plurality of battery modules, and a plurality of third temperatures of cores of the plurality of single cells;
   a controlling module, configured to:
      determine whether the plurality of first temperatures and/or the plurality of second temperatures are within a first temperature range;
      determine whether the plurality of third temperatures are within a second temperature range;
      manage the power battery according to the maximum temperature and the minimum temperature if the plurality of first temperatures and/or the plurality of second temperatures are within the first temperature range and the plurality of third temperatures are within the second temperature range;
      determine that a connection failure occurs in the power battery if one of the plurality of first temperatures and/or one of the plurality of second temperatures is not within the first temperature range; and determine a core related failure if the third temperature of a first single cell is not within the second temperature range.

9. The system according to claim 8, wherein the controlling module is configured to determine a core related failure if the third temperature of a first single cell is not within the second temperature range by steps of:

determining whether the third temperature of a second single cell adjacent to the first single cell is within the second temperature range if the third temperature of the first single cell is not within the second temperature range;

determining that a failure occurs in the temperature detecting module if the third temperature of the second single cell is within the second temperature range;

determining that a core failure occurs in the core of the first single cell if the third temperature of the second single cell is not within the second temperature range.

10. The system according to claim 9, wherein the controlling module is further configured to:

not allow charging/discharging the power battery if it is determined that the connection failure occurs in the power battery or the core failure occurs in the core of the first single cell; and allow charging/discharging the power battery if no connection failure occurs in the power battery and no core failure occurs in the cores of the plurality of single cells.

11. The system according to claim 9, further comprising: a display module configured to display an alarm message if it is determined that the core failure occurs in the core of the first single cell.

12. The system according to claim 8, wherein the controlling module is configured to manage the power battery according to the maximum temperature and the minimum temperature by steps of:

heating or cooling the power battery according to the maximum temperature and the minimum temperature; and controlling a charging/discharging power of the power battery according to the maximum temperature and the minimum temperature.

13. The system according to claim 8, further comprising: a display module configured to display an alarm message, if it is determined that the connection failure occurs in the power battery.

14. The system according to claim 8, wherein the temperature detecting module is configured as a temperature sensor.

15. A method for controlling a power battery, wherein the power battery comprises a plurality of battery modules, each battery module comprises a plurality of single cells, and the method comprises:

detecting a maximum temperature and a minimum temperature of the plurality of single cells;

detecting a plurality of electrode temperatures of electrodes of the plurality of battery modules;

determining whether the plurality of electrode temperatures are within an electrode temperature range;

managing the power battery according to the maximum temperature and the minimum temperature if the plurality of electrode temperatures are within the electrode temperature range; and determining that a connection failure occurs in the power battery if one of the plurality of electrode temperatures is not within the electrode temperature range.

16. The method of claim 15 further comprising:

detecting a plurality of core temperatures of cores of the plurality of single cells by a temperature detecting device;

determining whether the plurality of core temperatures are within a core temperature range;

managing the power battery according to the maximum temperature and the minimum temperature if the plurality of core temperatures are within the core temperature range; and determining a core related failure if the core temperature of a first single cell is not within the core temperature range.

17. The method of claim 16, wherein determining a core related failure if the core temperature of a first single cell is not within the core temperature range comprises:

determining whether the core temperature of a second single cell adjacent to the first single cell is within the core temperature range if the core temperature of the first single cell is not within the core temperature range;

determining that a failure occurs in the temperature detecting device if the core temperature of the second single cell is within the core temperature range;

determining that a core failure occurs in the core of the first single cell if the core temperature of the second single cell is not within the core temperature range.

18. The method of claim 15, wherein managing the power battery according to the maximum temperature and the minimum temperature comprises:

heating or cooling the power battery according to the maximum temperature and the minimum temperature; and controlling a charging/discharging power of the power battery according to the maximum temperature and the minimum temperature.

19. The method of claim 15, wherein detecting a plurality of electrode temperatures of electrodes of the plurality of battery modules comprises:

detecting a plurality of electrode temperatures of positive electrodes of the plurality of battery modules.

20. The method of claim 15, wherein detecting a plurality of electrode temperatures of electrodes of the plurality of battery modules comprises:

detecting a plurality of electrode temperatures of negative electrodes of the plurality of battery modules.

* * * * *